(12) United States Patent
Bozung et al.

(10) Patent No.: US 7,549,664 B2
(45) Date of Patent: Jun. 23, 2009

(54) MOTORCYCLE ANTI-TIPOVER DEVICE

(75) Inventors: Dennis A. Bozung, Saline, MI (US); Thomas L. Sundberg, Northville, MI (US); Kelly D. Osborne, Jackson, MI (US)

(73) Assignee: M.C. Technologies Group, Inc., Saline, MI (US)

( * ) Notice: Subject to any disclaimer, the term of this patent is extended or adjusted under 35 U.S.C. 154(b) by 239 days.

(21) Appl. No.: 11/474,761

(22) Filed: Jun. 26, 2006

(65) Prior Publication Data

US 2007/0040351 A1    Feb. 22, 2007

Related U.S. Application Data

(60) Provisional application No. 60/694,017, filed on Jun. 24, 2005.

(51) Int. Cl.
 *B62H 1/02* (2006.01)
(52) U.S. Cl. .................. 280/300; 280/293; 280/298; 280/304
(58) Field of Classification Search .............. 280/293, 280/298, 300, 304, 755
 See application file for complete search history.

(56) References Cited

U.S. PATENT DOCUMENTS

| | | | |
|---|---|---|---|
| 3,602,528 A | 8/1971 | Kelly | |
| 3,902,740 A | 9/1975 | Lucier et al. | |
| 3,908,780 A | 9/1975 | McClure et al. | |
| 3,930,667 A | 1/1976 | Osuchowski et al. | |
| 3,980,150 A | 9/1976 | Gigli | |
| 4,073,505 A | 2/1978 | Yamazaki | |
| 4,084,656 A | 4/1978 | Itoh et al. | |
| 4,145,069 A | 3/1979 | Kissick | |
| 4,181,190 A | 1/1980 | Yang | |
| 4,203,500 A | 5/1980 | Kamiya | |
| 4,227,717 A | 10/1980 | Bouvier | |
| 4,358,127 A | 11/1982 | Kissick | |
| 4,377,295 A | 3/1983 | Lemman | |
| 4,494,764 A | 1/1985 | Kelley | |
| 4,582,336 A | 4/1986 | Onoda | |
| 4,638,880 A | 1/1987 | Togashi | |
| 4,691,798 A * | 9/1987 | Engelbach | 180/209 |
| 4,693,488 A | 9/1987 | Bernocco | |
| 4,815,756 A | 3/1989 | Kitner | |
| 4,826,194 A | 5/1989 | Sakita | |
| 5,118,126 A | 6/1992 | Yaple | |
| 5,234,225 A | 8/1993 | Yaple | |
| 5,358,265 A | 10/1994 | Yaple | |
| 5,388,848 A | 2/1995 | Silva et al. | |
| 5,613,571 A | 3/1997 | Rank et al. | |
| 5,765,290 A | 6/1998 | Rank et al. | |
| 5,938,231 A | 8/1999 | Yamazaki | |
| 5,967,545 A | 10/1999 | Iijima et al. | |
| 6,007,090 A | 12/1999 | Hosono et al. | |

(Continued)

*Primary Examiner*—Paul N Dickson
*Assistant Examiner*—Michael R Stabley
(74) *Attorney, Agent, or Firm*—Dickinson Wright PLLC

(57) ABSTRACT

The present invention relates to a motorcycle anti-tipover device that has telescoping support arms that extend to the ground. The support arms are automatically extending when the motorcycle is stationary or moving at low speeds to prevent the motorcycle from tipping over. The telescoping support arms may also serve as a traditional kickstand, or may be used to lift the motorcycle during servicing. Alternatively, an airbag may be deployed underneath the motorcycle to prevent the motorcycle from tipping over.

24 Claims, 5 Drawing Sheets

U.S. PATENT DOCUMENTS

| | | |
|---|---|---|
| 6,034,594 A | 3/2000 | Gray |
| 6,113,133 A | 9/2000 | Iijima et al. |
| 6,170,846 B1 | 1/2001 | Holter |
| 6,213,237 B1 | 4/2001 | Willman |
| 6,268,794 B1 | 7/2001 | Tzanev |
| 6,276,707 B1 | 8/2001 | Ungvari |
| 6,296,266 B1 | 10/2001 | Martin |
| 6,394,738 B1 * | 5/2002 | Springer ..................... 414/673 |
| 6,527,077 B2 | 3/2003 | Yamamoto et al. |
| 6,685,208 B1 * | 2/2004 | Cowie ....................... 280/293 |
| 6,733,025 B2 | 5/2004 | Su et al. |
| 6,773,028 B2 | 8/2004 | Itabashi et al. |
| 6,845,999 B2 * | 1/2005 | Royal et al. .................. 280/304 |
| 7,396,033 B2 * | 7/2008 | Murata et al. ............... 280/293 |
| 2003/0085546 A1 | 5/2003 | Aussant |
| 2004/0195800 A1 | 10/2004 | Mullins |
| 2004/0256835 A1 | 12/2004 | Royal, Sr. et al. |

* cited by examiner

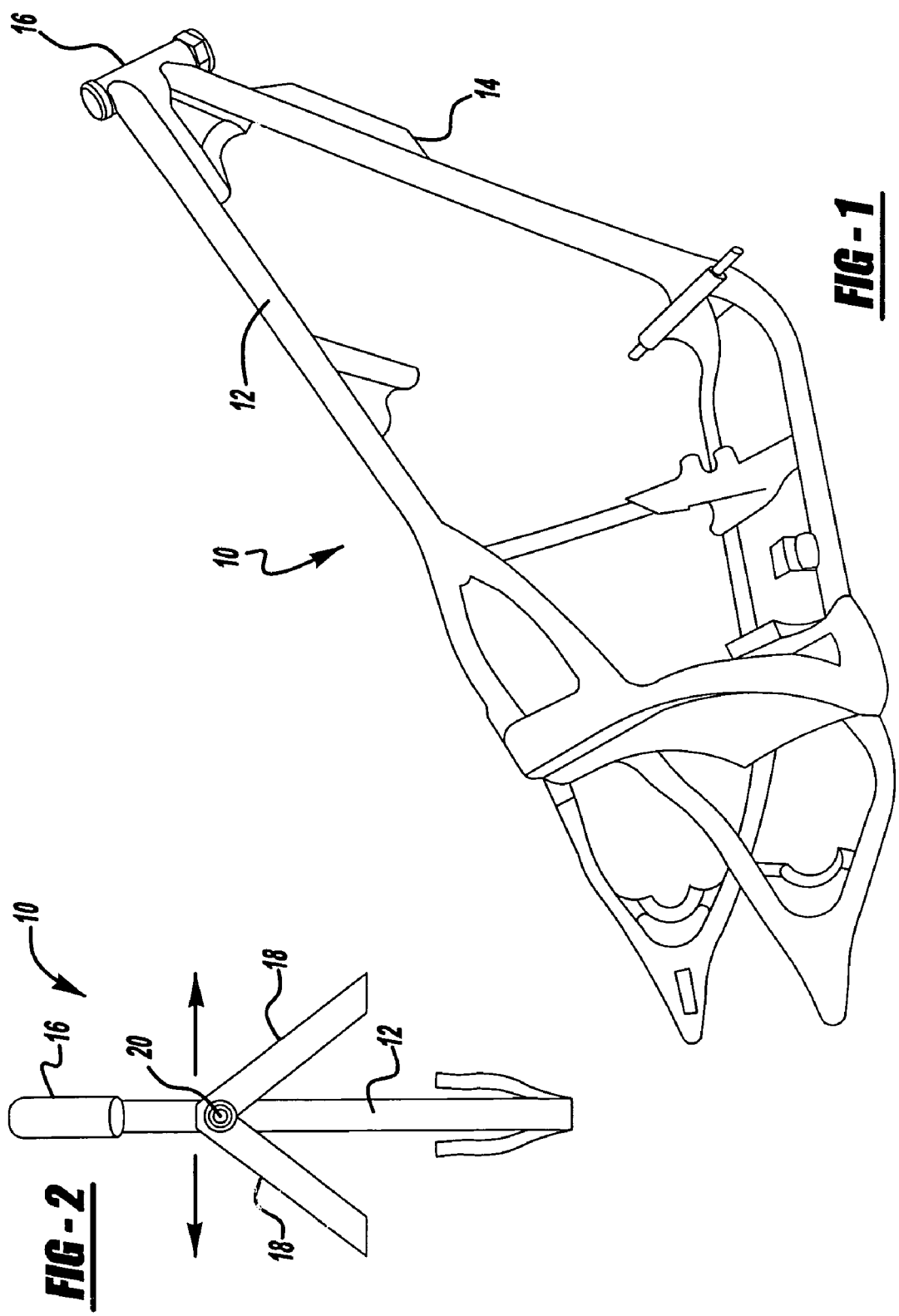

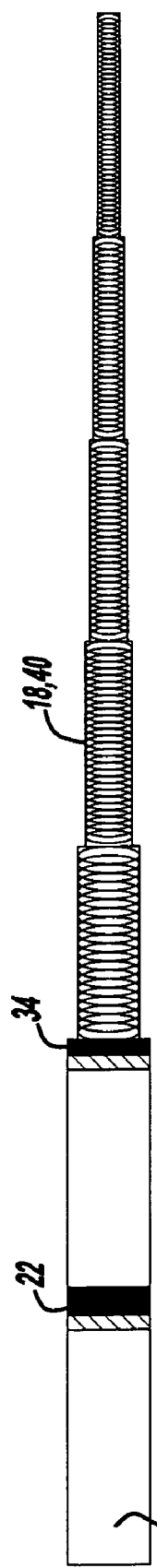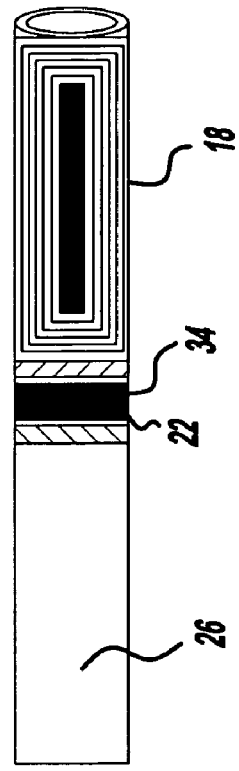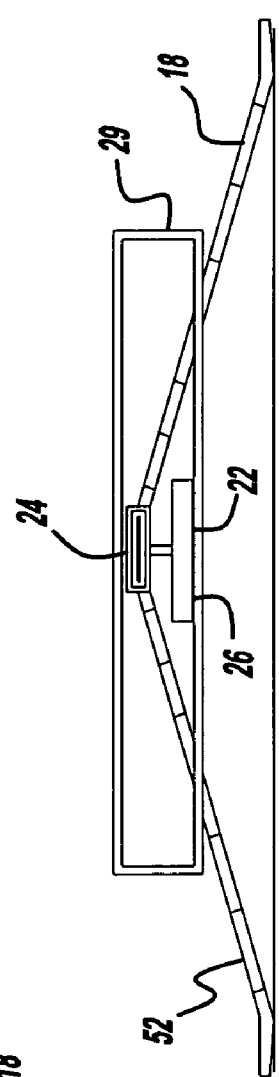

MOTORCYCLE ANTI-TIPOVER DEVICE

CROSS-REFERENCE TO RELATED APPLICATION

This application claims the benefit of U.S. Provisional Application Ser. No. 60/694,017, filed Jun. 24, 2005, the entire disclosure of the provisional application being considered part of the disclosure of this application and hereby incorporated by reference.

FIELD OF THE INVENTION

The present invention generally relates to a tandem-wheeled vehicle, such as a motorcycle. More specifically, the present invention relates to an anti-tipover device for a tandem-wheeled vehicle.

BACKGROUND OF THE INVENTION

Anti-tipover devices for motorcycles are well known in the prior art. The prior art patents disclose an anti-tipover device having support arms mounted to a frame of a motorcycle. The motorcycle employs an electrical and mechanical system that causes the support arms to extend to the ground to provide support. Alternative anti-tipover devices are activated as the motorcycle slows down. Because the anti-tipover device is deployed while the motorcycle is moving, it includes wheels similar to training wheels found a bicycle. With wheels, the anti-tipover device cannot double as a kickstand. Also, many motorcycle operators find it advantageous to elevate the motorcycle during servicing, however, the wheels allow the motorcycle to roll.

Despite the teachings of the prior art, there remains an opportunity to improve anti-tipover devices. For example, motorcycle operators may enjoy an anti-tipover device that is hidden from view until it is deployed. In addition, aside from preventing a motorcycle from tipping over, many motorcycle operators will appreciate using the anti-tipover device as a kick-stand to support the motorcycle when at rest, or using the anti-tipover device to elevate the motorcycle during servicing. The present invention provides an anti-tipover device that includes these features.

BRIEF DESCRIPTION OF THE DRAWINGS

Other advantages of the present invention will be readily appreciated, as the same becomes better understood by reference to the following detailed description when considered in connection with the accompanying drawings and photographs wherein:

FIG. 1 is a perspective view of a motorcycle frame having an anti-tipover device assembled in accordance with a first embodiment of the subject invention;

FIG. 2 is a cross-sectional view of the anti-tipover device assembled in accordance with the first embodiment of the subject invention;

FIG. 3 is an elevational view of a telescoping support arm in a fully telescoped position and assembled in accordance with the first and second embodiments of the subject invention;

FIG. 4 is an elevational view of the telescoping support arm of FIG. 3 in a collapsed condition and assembled in accordance with the first and second embodiments of the subject invention;

FIG. 5 is a front view of the telescoping support arm of FIGS. 3 and 4 mounted to the motorcycle and assembled in accordance with the first embodiment of the subject invention;

DETAILED DESCRIPTION OF THE INVENTION

Figure 6:
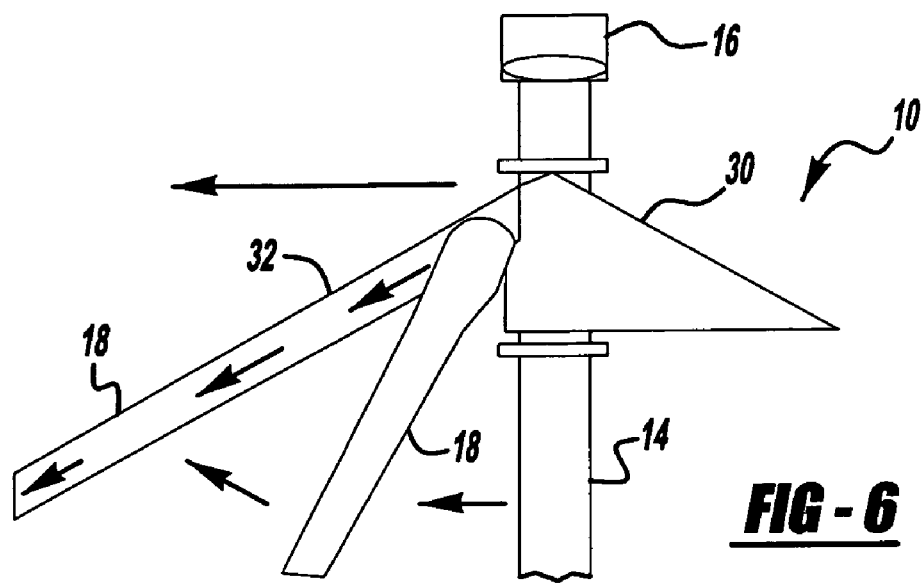
FIG. 6 is a blown-up view of the anti-tipover device shown in FIG. 2 with a stop and assembled in accordance with the first embodiment of the subject invention.

An anti-tipover device 10 that extends to prevent a motorcycle from tipping over is shown attached to a motorcycle. Referring to FIGS. 1 and 2, in a first embodiment, the motorcycle anti-tipover device 10 is attached to the motorcycle frame 12. A typical motorcycle frame 12 includes a lower frame 14 extending downwardly from a steering sleeve 16. A pair of support arms 18 pivotally attach to the lower frame 14. In order to provide stability, the support arms 18 are positioned to extend in different directions. For example, one of the support arms 18 extends from a left side of the motorcycle, and another of the support arms 18 extends from a right side of the motorcycle. When extended, the support arms 18 help to stabilize the motorcycle.

The support arms 18 pivotally attach to a top of the lower frame 14 at a single pivot point 20. The pivot point 20 passes through each of the support arms 18 and the lower frame 14. Each support arm 18 includes telescoping parts and is normally stored in a collapsed condition in line with the lower frame 14 by an electromagnet 22. FIGS. 3 and 4 show the support arms 18 in an extended condition and an undeployed or collapsed condition, respectively. As the motorcycle begins to tip over, a sensor mechanism, which could include one of the GPS sensor, motion sensor, infrared sensor, gravity switch, and any other conventional device suitable for carrying out this function, senses the tipping and enables a deployment mechanism 24 shown generally in FIG. 5. The deployment mechanism 24 pivots the support arms 18 outwardly in opposite directions away from the lower frame 14, causing the support arms 18 to form a V-shape from the pivot point 20. When extended, the support arms 18 support the motorcycle. The support arms 18 may be automatically deployed when the motorcycle is standing still, or alternatively, when the motorcycle is moving at low speeds. For example, the anti-tipover device 10 may only deploy when the motorcycle is traveling below 10 miles per hour, and preferably below 2 miles per hour. When activated, the deployment mechanism 24 pivots and extends the support arms 18 through various measures including a propellant, an electrical actuator, a hydraulic system, an electromagnetic system, or springs.

Figure 10:
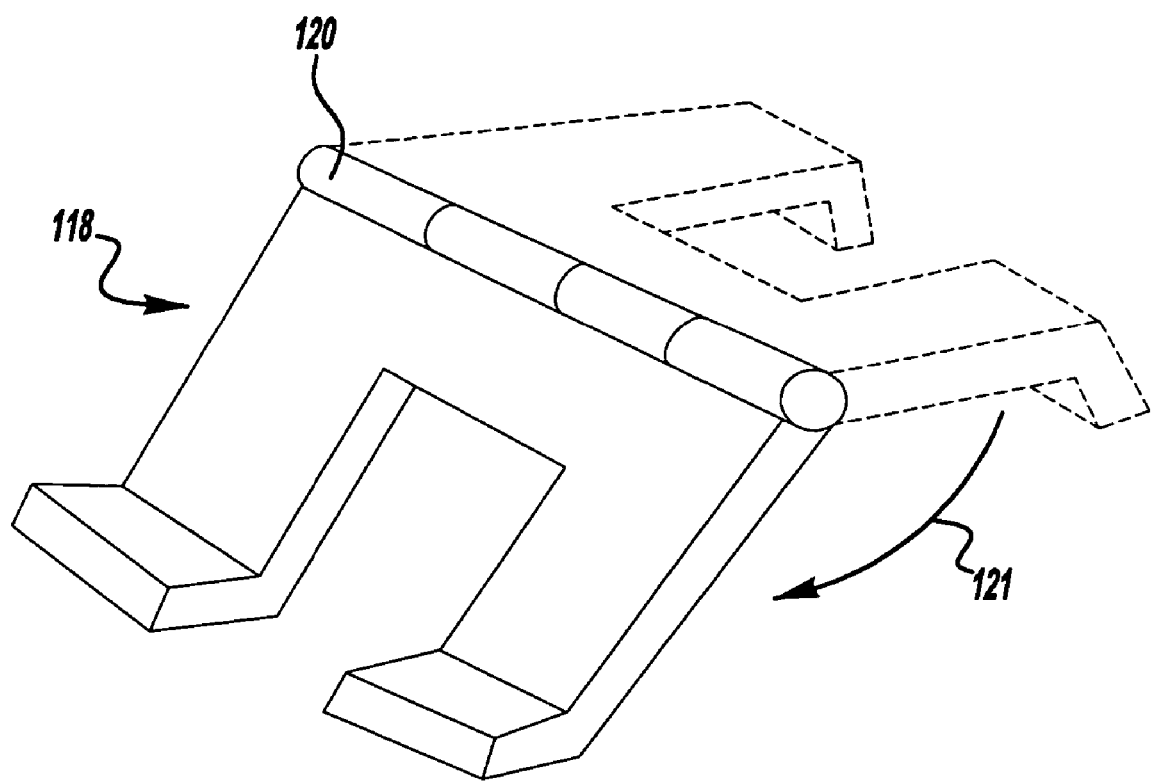
FIG. 10 is a perspective view of the motorcycle anti-tipover device assembled in accordance with the third embodiment of the subject invention.

As shown in FIG. 10, as an alternative to the telescoping support arms 18 described above, the support arms 118 may be non-telescoping and connected to the motorcycle by a hinge 120. In the undeployed condition (as shown in dotted lines in FIG. 10), the support arms 118 are secured to the bottom of the motorcycle to remain hidden from view by, for example, a latch or similar mechanism. In one embodiment, a spring is included in the hinge and utilized as part of the deployment mechanism. The spring is biased to the deployed/extended condition. During deployment, the latch or similar mechanism releases the support arms 118 and the spring hinge propels the support arms 118 in the direction of arrow 121 to the deployed position (as shown in solid lines in FIG. 10). The latch or similar mechanism may be controlled by, for example, a solenoid or electromagnet, although any locking mechanism may be utilized. Other deployment mechanisms, for example, the hydraulic, propellant and electromagnetic systems described above, may be utilized with this non-telescoping support arms 118 embodiment.

Figure 9:
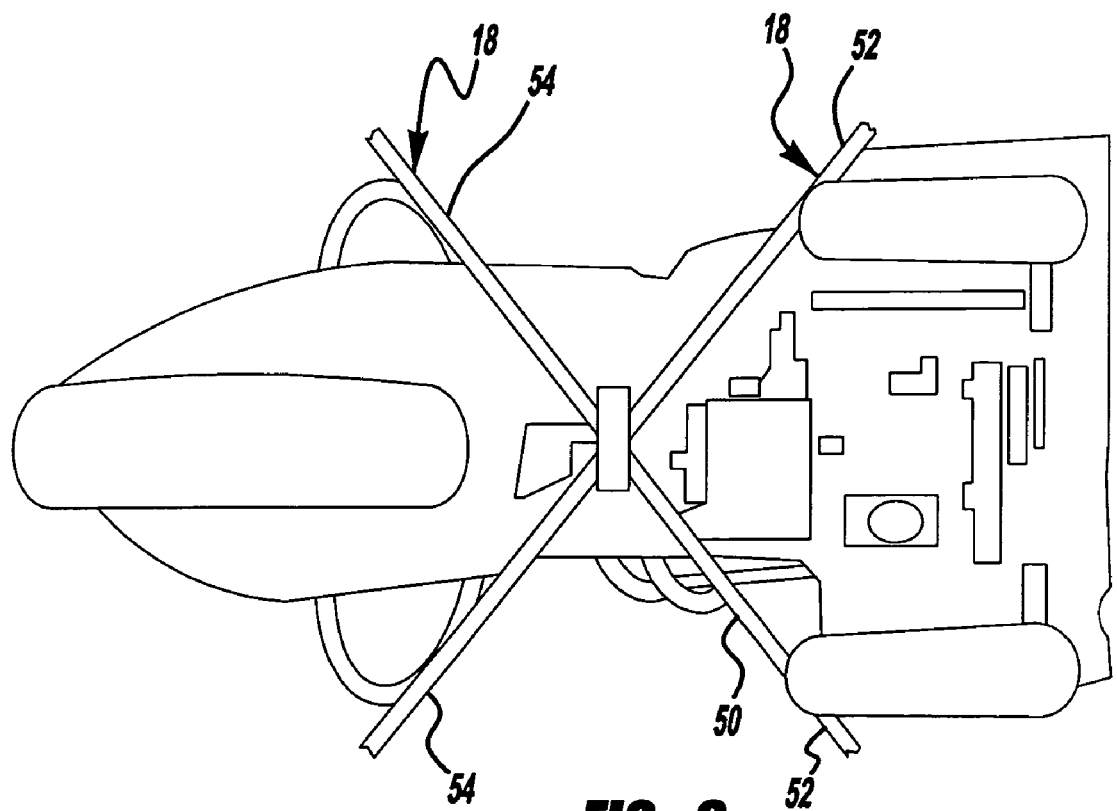
FIG. 9 is a bottom view of the motorcycle anti-tipover device assembled in accordance with the first embodiment of the subject invention.

Referring back to FIGS. 3 and 4, the deployment mechanism 24 may alternatively operate in any number of ways. One possibility is for the deployment mechanism 24 to include an electromagnet 22 and a repelling magnet 34. As the deployment mechanism 24 charges the electromagnet 22 a force is generated between the electromagnet 22 and the repelling magnet 34. The force between the electromagnet 22 and the repelling magnet 34 is large enough to extend the support arms 18 to an extended condition. As shown in FIG. 3, the support arms 18 may be spring loaded to help the support arms 18 extend. As an alternative example, FIG. 5 illustrates a front view of an anti-tipover device 10 that uses a propellant to extend the support arms 18. In this instance, propellant fluid 26 is stored in a propellant reservoir 28. The propellant reservoir 28 is contained within a housing 29. The deployment mechanism 24 pumps the propellant fluid 26 from the propellant reservoir 28 to the support arms 18. A force is generated by the propellant fluid 26, which pushes the support arms 18 into the extended condition. It should be noted that the propellant reservoir 28 can be located anywhere on the motorcycle. Therefore, the propellant reservoir 28 may be located inside the motorcycle frame 12, or attached externally to any part of the motorcycle. If the propellant reservoir 28 is located inside the motorcycle frame 12, then the frame 12 acts as a chamber for holding the propellant fluid 26. Other deployment mechanisms could be employed to extend the support arms. By way of non-limiting example, a hydraulic system that controls the extension and retraction of the support arms may be utilized in place of, or in combination with, the electromagnet and propellant examples above. In addition, since FIG. 5 is a front view, it should be understood that the anti-tipover device could include more than two support arms 18. FIG. 5 illustrates a pair of front support arms 52, but could also include a pair of rear support arms 54, as shown in FIG. 9. Furthermore, a combination of these techniques may be employed to extend the support arms 18. As was previously described, an electromagnetic system may be combined with springs to facilitate the extending of the support arms 18.

Referring now to FIG. 6, an additional feature of the anti-tipover device 10 of the present invention includes a stop 30 for providing a stealthy design. When the anti-tipover device is not in use, the stop 30 houses the support arms 18, and hides the support arms 18 from view. Alternatively, the stop 30 is used to limit the movement of the support arms 18. In order to limit the movement of the support arms 18, the stop 30 includes walls 32 that form a semi-conical shape that extends partially about the frame 14. More specifically, once the sensor mechanism triggers the deployment mechanism 24, the support arms 18 extend outwardly as described above and into engagement with the walls 32 of the stop 30. Typically, when deployed by the sensor mechanism and the deployment mechanism 24, two support arms 18 are extended.

Referring to FIG. 9, another use of the anti-tipover device 10 includes extending the support arms 18 manually. One reason a motorcycle operator may want to extend the support arms 18 manually is to use the anti-tipover device 10 as a traditional kickstand. In this case, one support arm 50 is extended by a user-operated switch or button. Instead of relying on the sensor mechanism to detect when the motorcycle is tipping over, a motorcycle operator can actuate a button or switch located on the motorcycle that triggers the deployment mechanism 24 which will extend the support arm 50. Furthermore, the support arms 18 may be manually extended in a way that lifts the motorcycle off the ground to provide access to parts of the motorcycle that are otherwise inaccessible. Lifting the motorcycle off the ground is especially useful when servicing the motorcycle. As shown in FIG. 9, the anti-tipover device 10 includes four support arms 18 for lifting the motorcycle. When the motorcycle is tipping over, only the front support arms 52 are deployed. On the other hand, when the anti-tipover device 10 is used to lift the motorcycle, both the front support arms 52 and the rear support arms 54 are extended through a controlled deployment. Therefore, the anti-tipover device 10 of the present invention may be manually or automatically actuated for multiple purposes.

Figure 7:
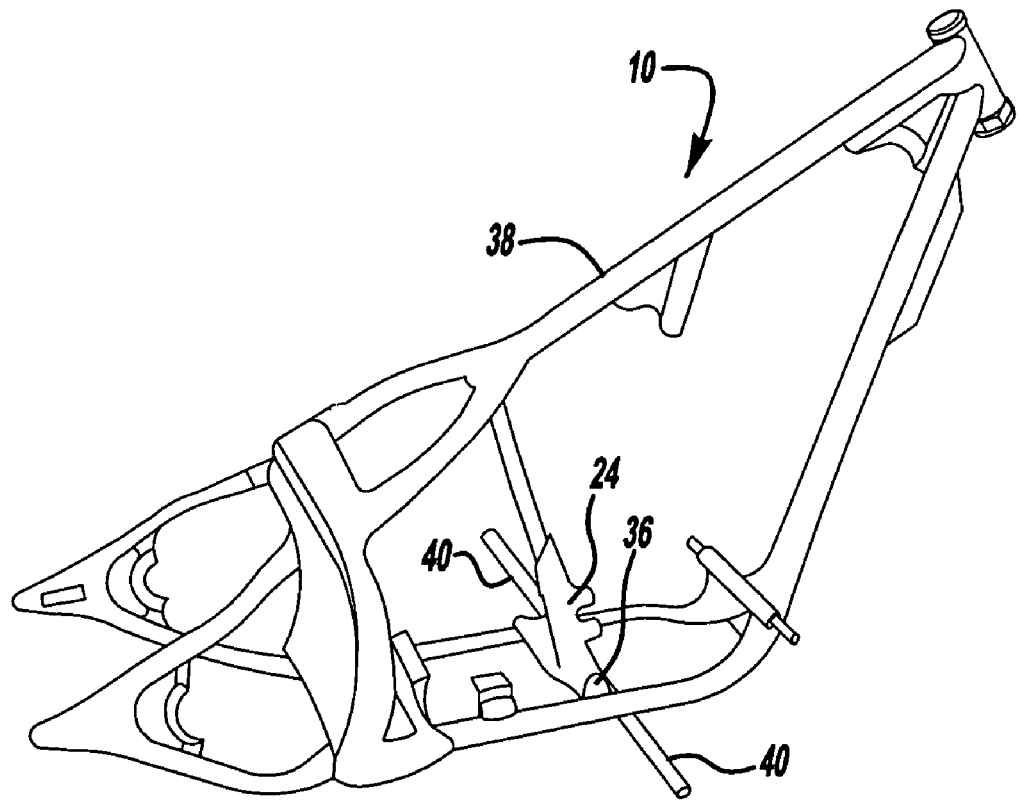
FIG. 7 is a perspective view of the motorcycle anti-tipover device assembled in accordance with the second embodiment of the subject invention.

Referring now to the attached FIG. 7, in a second embodiment, the motorcycle anti-tipover device 10 includes a housing 36 attached horizontally to a bottom portion of a motorcycle frame 38. The housing 36 is a hollow, rectangular bar or tube, and is open at both ends. The open ends of the housing 36 face a direction perpendicular to the wheels of the motorcycle and parallel to the ground. Telescoping support arms 40 are compressed and sheltered within the housing 36. As the motorcycle begins to tip over, a sensor mechanism enables the deployment mechanism 24, which telescopically extends the support arms 40 beyond the length of the housing 36. With respect to the second embodiment, the support arms 40 extend in a plane parallel to the housing 36 and perpendicular with respect to the motorcycle using any of the methods described previously. Alternatively, the housing 36 may be completely enclosed, and the support arms 40, when deployed, break through the walls of the housing 36.

Figure 8:
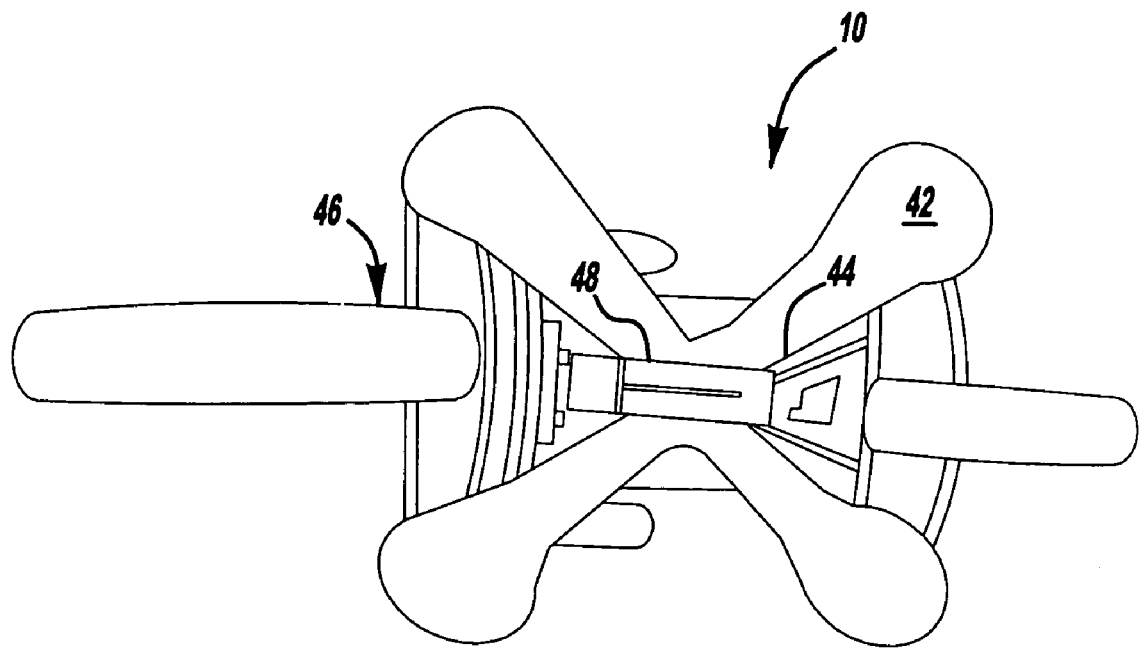
FIG. 8 is a bottom view of a motorcycle anti-tipover device assembled in accordance with a third embodiment of the subject invention.

Referring now to the attached FIG. 8, in a third embodiment, the anti-tipover device 10 includes an airbag 42 fixed to the bottom of a motorcycle frame 44. As a motorcycle 46 begins to tip over, the sensor mechanism triggers a deployment mechanism that inflates the airbag 42 underneath the motorcycle 46. Before it is inflated, the airbag is housed in a chamber 48. When the sensor mechanism detects that the motorcycle 46 is tipping, it enables the deployment mechanism, which quickly inflates the airbag 42 with a gas. As the airbag 42 inflates, it breaks out of the chamber 48 and extends underneath the motorcycle 46. The airbag 42 remains attached to the frame 44 to provide a base for the motorcycle 46 to rest upon, thereby stabilizing the motorcycle 46, for example, by prohibiting further tipping of the motorcycle 46 or even bringing the motorcycle to the upright position. The airbag 42 deployment Although the airbag 42 can be of any shape that will achieve the same result, the airbag 42 in FIG. 8 is shaped to generally extend in a plane that is perpendicular to the motorcycle 46. For example, the airbag in FIG. 8 is shown to be X-shaped.

It should be understood that the anti-tipover device 10 of can be fixed to any attached component of the motorcycle. For example, the anti-tipover device 10 could attach to a rear suspension, a rear frame, a mid frame, a front frame, and a front suspension of the motorcycle. In addition, the anti-tipover device may attach to any other component attached to the motorcycle such as bags, fairings, brackets, a fender, mounts, a rear seat, a crash bar, a front rest or peg, a seat, a transmission, a chain guard, other guards including a drive shaft, a belt guard, a fuel tank, a fender mount, forks, handlebars, and a windshield.

Obviously, many modifications and variations of the present invention are possible in light of the above teachings.

The invention may be practiced otherwise than as specifically described within the scope of the appended claims.

We claim:

1. A motorcycle anti-tipover device, comprising:
   a support arm assembly capable of being coupled to a motorcycle frame at a pivot point, said support arm assembly comprising at least two support arms, wherein each of said at least two support arms extend outwardly from a vertical axis of said motorcycle when deployed in an extended condition and remain contracted while undeployed in a collapsed condition,
   a sensor mechanism, said sensor mechanism being capable of detecting a tip condition and outputting a tip signal upon detection of said tip condition, and
   a deployment mechanism operably coupled to said support arm assembly and said sensor mechanism, said deployment mechanism causing said at least two support arms to deploy to said extended condition upon receipt of said tip signal from said sensor mechanism;
   a manual extension mechanism coupled to said deployment mechanism and being capable of outputting a manual extension signal upon request of a user, said manual extension mechanism causing said deployment mechanism to cause said at least two support arms to deploy to said extended condition upon receipt of said manual extension signal.

2. The motorcycle anti-tipover device of claim 1, wherein said manual extension mechanism comprises a button or a switch.

3. The motorcycle anti-tipover device of claim 1, wherein said support arm assembly is capable of supporting said motorcycle in a stable resting position.

4. The motorcycle anti-tipover device of claim 1, wherein said support arm assembly further comprises at least two additional support arms.

5. The motorcycle anti-tipover device of claim 1, wherein said deployment mechanism comprises an electromagnet and a repelling magnet configured such that said electromagnet and said repelling magnet are repelled upon power being provided to said electromagnet.

6. The motorcycle ant-tipover device of claim 5, wherein said deployment mechanism further comprises springs configured to assist deploying said at least two support arms to said extended condition.

7. The motorcycle anti-tipover device of claim 1, wherein said deployment mechanism comprises a propellant mechanism.

8. The motorcycle anti-tipover device of claim 1, wherein sensor mechanism comprises at least one of a GPS sensor, motion sensor, infrared sensor or gravity switch.

9. The motorcycle anti-tipover device of claim 1, further comprising a stop to house said support arm assembly, said stop limiting movement of said at least two support arms in said extended condition.

10. The motorcycle anti-tipover device of claim 1, wherein said at least two support arms comprise a telescoping tubular structure.

11. The motorcycle anti-tipover device of claim 10, wherein said deployment mechanism comprises an electromagnet and a repelling magnet configured such that said electromagnet and said repelling magnet are repelled upon power being provided to said electromagnet.

12. The motorcycle anti-tipover device of claim 11, wherein said deployment mechanism further comprises springs configured to assist deploying said at least two support arms to said extended condition.

13. The motorcycle anti-tipover device of claim 1, wherein said deployment mechanism comprises a hydraulic actuator.

14. The motorcycle anti-tipover device of claim 13, wherein said deployment mechanism further comprises springs configured to assist deploying said at least two support arms to said extended condition.

15. The motorcycle anti-tipover device of claim 13, further comprising a stop to house said support arm assembly, said stop limiting movement of said at least two support arms in said extended condition.

16. The motorcycle anti-tipover device of claim 15, wherein said deployment mechanism further comprises springs configured to assist deploying said at least two support arms to said extended condition.

17. A motorcycle anti-tipover device, comprising:
   a support arm assembly capable of being coupled to a motorcycle frame at a pivot point, said support arm assembly comprising at least two support arms, wherein each of said at least two support arms extend outwardly from a vertical axis of said motorcycle when deployed in an extended condition and remain contracted while undeployed in a collapsed condition,
   a sensor mechanism, said sensor mechanism being capable of detecting a tip condition and outputting a tip signal upon detection of said tip condition, and
   a deployment mechanism operably coupled to said support arm assembly and said sensor mechanism, said deployment mechanism causing said at least two support arms to deploy to said extended condition upon receipt of said tip signal from said sensor mechanism;
   said deployment mechanism comprises an electromagnet and a repelling magnet configured such that said electromagnet and said repelling magnet are repelled upon power being provided to said electromagnet.

18. The motorcycle anti-tipover device of claim 17, wherein said support arm assembly is capable of supporting said motorcycle in a stable resting position.

19. The motorcycle anti-tipover device of claim 17, wherein said support arm assembly further comprises at least two additional support arms.

20. The motorcycle anti-tipover device of claim 17, wherein said deployment mechanism further comprises springs configured to assist deploying said at least two support arms to said extended condition.

21. The motorcycle anti-tipover device of claim 17, wherein sensor mechanism comprises at least one of a GPS sensor, motion sensor, infrared sensor or gravity switch.

22. The motorcycle anti-tipover device of claim 17, further comprising a stop to house said support arm assembly, said stop limiting movement of said at least two support arms in said extended condition.

23. The motorcycle anti-tipover device of claim 17, further comprising a manual extension mechanism coupled to said deployment mechanism and being capable of outputting a manual extension signal upon request of a user, said manual extension mechanism causing said deployment mechanism to cause said at least two support arms to deploy to said extended condition upon receipt of said manual extension signal.

24. The motorcycle anti-tipover device of claim 17, wherein said at least two support arms comprise a telescoping tubular structure.

* * * * *

UNITED STATES PATENT AND TRADEMARK OFFICE
CERTIFICATE OF CORRECTION

PATENT NO.       : 7,549,664 B2                                          Page 1 of 1
APPLICATION NO.  : 11/474761
DATED            : June 23, 2009
INVENTOR(S)      : Dennis A. Bozung et al.

It is certified that error appears in the above-identified patent and that said Letters Patent is hereby corrected as shown below:

Column 5/line 42: "ant-tipover" should read "anti-tipover"

Signed and Sealed this

Fifth Day of October, 2010

David J. Kappos
*Director of the United States Patent and Trademark Office*